United States Patent [19]

Aoki

[11] Patent Number: 5,157,633
[45] Date of Patent: Oct. 20, 1992

[54] FIFO MEMORY DEVICE

[75] Inventor: Masao Aoki, Yokohama, Japan

[73] Assignee: Matsushita Electric Industrial Co., Ltd., Osaka, Japan

[21] Appl. No.: 575,364

[22] Filed: Aug. 30, 1990

[30] Foreign Application Priority Data

Sep. 4, 1989 [JP] Japan .................. 1-228509

[51] Int. Cl.[5] .............................................. G11C 7/00
[52] U.S. Cl. .............................. 365/221; 365/189.07; 365/154; 365/239
[58] Field of Search ................. 365/221, 189.07, 239, 365/154

[56] References Cited

U.S. PATENT DOCUMENTS

| | | |
|---|---|---|
| 3,646,526 | 2/1972 | Fagan et al. . |
| 4,236,225 | 11/1980 | Jansen et al. . |
| 4,819,201 | 4/1989 | Thomas et al. . |
| 4,888,741 | 12/1989 | Malinowski .................... 365/221 |
| 5,016,221 | 5/1991 | Hamstra .................... 365/189.07 |
| 5,036,489 | 7/1991 | Theobald .................... 365/221 |
| 5,046,051 | 9/1991 | Doornhein et al. ............... 365/239 |

FOREIGN PATENT DOCUMENTS

| | | |
|---|---|---|
| 0146418 | 6/1985 | European Pat. Off. . |
| 0207439 | 1/1987 | European Pat. Off. . |
| 0260411 | 3/1988 | European Pat. Off. . |

OTHER PUBLICATIONS

Trade Model SN 745225 "Asynchronous FIFO Memory" by Texas Instrument Co., Ltd. pp. 6-34 through 6-41.

Primary Examiner—Joseph E. Clawson, Jr.
Attorney, Agent, or Firm—Stevens, Davis, Miller & Mosher

[57] ABSTRACT

An FIFO memory device which is used for digital communication devices and the like comprises a plurality of D-flip flops cascade-connected with each other for storing data; selectors connected between the D-flip flops for selecting an input data or a data to be stored which is outputted from the D-flip flop on the previous stage; and control circuits responsive to a clock signal, a write signal and a read signal for controlling the storing operation of the D-flip flops and the selection operation of the selectors. The control circuit stores a signal representative of presence or absence of data stored in the D-flip flops and performs control in such a manner that an input data is transferred to the D-flip flop on the final stage in which no data has been written for writing the data therein in response to a write signal and that data on respective D-flip flops are simultaneously shifted to the D-flip flop on the subsequent stage on every clock in response to a read signal.

11 Claims, 12 Drawing Sheets

FIG. 3

| STATE NO. | INPUT | | | | | OUTPUT | |
|---|---|---|---|---|---|---|---|
| | WR | RD | Sn-1 | Sn+1 | Sn | LD | D |
| 1 | 0 | 0 | 0 | 0 | 0 | 0 | 0 |
| 2 | 1 | 0 | 0 | 0 | 0 | 0 | 0 |
| 3 | 0 | 1 | 0 | 0 | 0 | 0 | 0 |
| 4 | 1 | 1 | 0 | 0 | 0 | 0 | 0 |
| 5 | 0 | 0 | 1 | 0 | 0 | 1 | 1 |
| 6 | 1 | 0 | 1 | 0 | 0 | 1 | 1 |
| 7 | 0 | 1 | 1 | 0 | 0 | 1 | 1 |
| 8 | 1 | 1 | 1 | 0 | 0 | 1 | 1 |
| 9 | 0 | 0 | 0 | 1 | 0 | 0 | 0 |
| 10 | 1 | 0 | 0 | 1 | 0 | 1 | 1 |
| 11 | 0 | 1 | 0 | 1 | 0 | 0 | 0 |
| 12 | 1 | 1 | 0 | 1 | 0 | 0 | 0 |
| 13 | 0 | 0 | 1 | 1 | 0 | 1 | 1 |
| 14 | 1 | 0 | 1 | 1 | 0 | 1 | 1 |
| 15 | 0 | 1 | 1 | 1 | 0 | 1 | 1 |
| 16 | 1 | 1 | 1 | 1 | 0 | 1 | 1 |
| 17 | 0 | 0 | 0 | 0 | 1 | 0 | 0 |
| 18 | 1 | 0 | 0 | 0 | 1 | 1 | 1 |
| 19 | 0 | 1 | 0 | 0 | 1 | 0 | 0 |
| 20 | 1 | 1 | 0 | 0 | 1 | 1 | 1 |
| 21 | 0 | 0 | 1 | 0 | 1 | 1 | 1 |
| 22 | 1 | 0 | 1 | 0 | 1 | 1 | 1 |
| 23 | 0 | 1 | 1 | 0 | 1 | 1 | 1 |
| 24 | 1 | 1 | 1 | 0 | 1 | 1 | 1 |
| 25 | 0 | 0 | 0 | 1 | 1 | 0 | 1 |
| 26 | 1 | 0 | 0 | 1 | 1 | 0 | 1 |
| 27 | 0 | 1 | 0 | 1 | 1 | 0 | 0 |
| 28 | 1 | 1 | 0 | 1 | 1 | 1 | 1 |
| 29 | 0 | 0 | 1 | 1 | 1 | 0 | 1 |
| 30 | 1 | 0 | 1 | 1 | 1 | 0 | 1 |
| 31 | 0 | 1 | 1 | 1 | 1 | 1 | 1 |
| 32 | 1 | 1 | 1 | 1 | 1 | 1 | 1 |

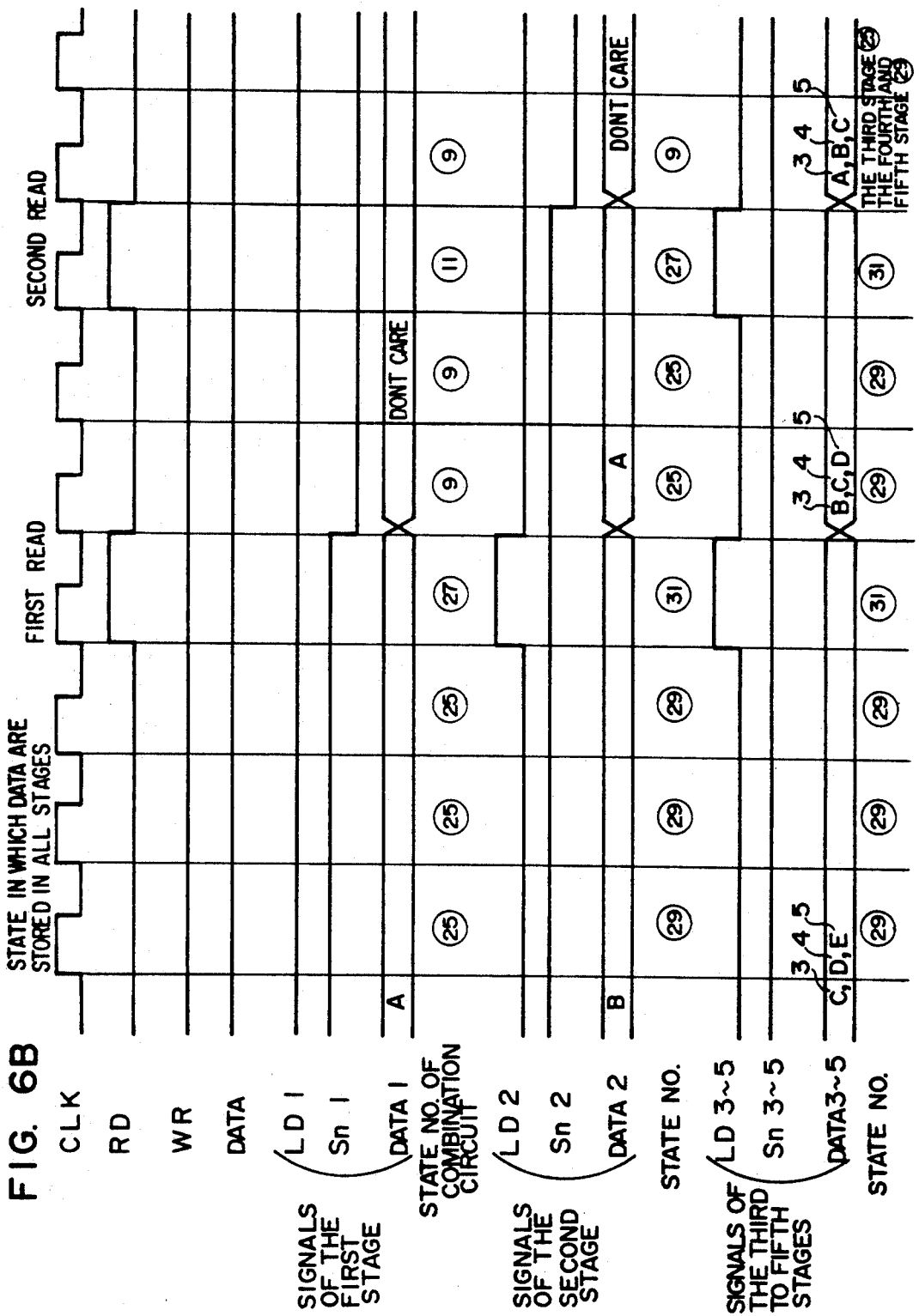

FIFO MEMORY DEVICE

BACKGROUND OF THE INVENTION

The present invention relates to a FIFO (First-in first-out) memory device which is used in digital communication devices and the like, and in particular to a FIFO memory device which is capable of shortening a period of time required for writing or reading a data into or from a FIFO memory device having a plurality of memory means which are cascade-connected with each other.

A read/write operation of such a type of FIFO memory device is carried out as follows: data are sequentially shifted along a cascade connection of memory means such as D-latch circuits in accordance with each clock signal from a memory means from an input side to an output side. For example, in data write mode, a data must be always written into a leading or first memory means of the cascade connection. In other words, after writing a data into the first memory means, it is necessary to sequentially shift data from one memory means to the next memory means, which one memory means is closer to an ending or last memory means in order to shift the data of the first memory means to the second memory means and write a new data into the first memory means. In data read mode, a data in the last memory means is firstly read-out in response to one-clock operation and then a shift operation of the data in each memory means to a respective next memory means responsive to a next one-clock operation is repeated, so that respective data is sequentially shifted to the last memory means.

Although a prior art FIFO memory device such as trade model SN74S225 "asynchronous FIFO memory" commercially available from Texas Instrument Co., Ltd. is known, structure and operation of the above-mentioned type memory device which was manufactured by the present assignee will be described in detail with reference to FIG. 7.

In FIG. 7, reference numerals 61, 62 and 63 denote D-latch circuits on each stage encircled by a dotted line which stores an input data Y including one-bit or plural bits and outputs to the next stage.

Reference numerals 64, 67, 610 denote NAND circuits on each stage. 65, 68 and 611 each denotes a D-flip-flop circuit on each stage. Those NAND and D and R-S flip-flop circuits form a circuit for controlling read and write of three-stages D-latch circuits 61, 62 and 63.

In FIG. 7, in an initial state, that is, in a stage that no data is stored in all D-latch circuits 61, 62 and 63, all R-S flip flop circuit 66, 69 and 612 are in a reset state (an output signal on a Q terminal is on a low level).

All D-flip flop circuits 65, 68 and 611 are in a set state (an output signal on the Q terminal is on a high level). An input signal X is on a low level and an input data is on a high level. External clocks CK are consecutive pulses which are used as synchronization clocks for shifting the data Y to the next stage. Since the data Y is shifted in a synchronization relationship with the external clock CK, the external clocks CK are necessary to be sufficiently faster than the data Y in comparison to write and read.

Now, write operation of the prior art will be described. When the input signal becomes a high level, all input signals to the NAND circuit 64 on a first stage becomes a high level, so that an output signal of the NAND circuit 64 becomes a low level. When a clock signal rises up at this time, an output signal on the Q terminal of the D-flip flop circuit 65 becomes a low level at the rise-up edge of the clock CK.

When the output signal on the Q terminal of the D-flip flop circuit 65 becomes a low level, simultaneously the R-S flip flop 66 is set and the D-latch circuit 61 is enabled.

When the R-S flip flop 66 is set, simultaneously the output signal of a $\bar{Q}$ terminal becomes low level so that the output signal of the NAND circuit 64 is returned to a high level.

At a second clock, the output signal on the Q terminal of the D-flip flop circuit 65 becomes a high level. Accordingly, the D-latch circuit 61 is disabled. It is necessary for the input signal X to return to a low level by the time of rise-up edge of a third clock for preventing the data Y from being inputted to the D-latch circuit 61 twice.

Operation of the D-latch circuit 61 on the first stage in the above mentioned write operation will be described.

As mentioned above, the D-latch circuit 61 is rendered enable at the rise-up edge of the first clock CK and is rendered disable at the rise-up edge of the second clock CK so that an input data Y is taken to and stored in the D-latch circuit 61.

Therefore, each circuit on the second stage performs the same operation as the corresponding circuit on the first stage since all input signals to the NAND gate 67 on the second stage become high level when the R-S flip flop 66 on the first stage is set.

Since the Q terminal of the D-latch circuit 68 on the second stage (an enabling signal of the latch circuit 62) is connected with a reset terminal R of the R-S flip flop circuit 66 on the first stage, the R-S flip flop circuit 66 is reset when a data held by the D-latch circuit 61 on the first stage is taken and stored in the D-latch 62 on the second stage and the D-latch circuit 61 on the first stage is brought into such a state that it may store a new data.

Accordingly, the input signal Y is sequentially shifted to subsequent stages since corresponding circuits on respective stages are identical with each other.

Now, read operation of the above mentioned prior art will be described. It is assumed that data is stored in all D-latch circuits 61, 62 and 63 and that all the R-S flip flop circuits 66, 69 and 612 are set.

In FIG. 7, when a data held in the D-latch circuit 63 on the final stage is read out and an input signal Z becomes low level, the R-S flip flop circuit 612 on the final stage is reset. When the input signal Z is then returned to high level, the output signal on the Q terminal of the D-flip flop circuit 611 becomes low level at the rise-up edge of the first clock CK.

Accordingly, when the R-S flip flop circuit 612 is set, the D-latch circuit 63 is enabled and the output signal from the NAND circuit 610 is returned to high level. Therefore, the output signal on the Q terminal of the D-flip flop 611 becomes a high level at the rise-up edge of the next clock CK and the D-latch circuit 63 is disabled.

Operation of the D-latch circuit on the final stage in the read operation will be described.

As mentioned above, the D-latch circuit 63 is enabled at the rise-up edge of the first clock CK after the input signal Z has become a high level and the D-latch circuit 63 is disabled at the rise-up edge of the second clock CK. Accordingly, a data held in the D-latch circuit 62 on the previous stage is taken into the D-latch circuit 63 on the final stage and read of the next data becomes possible.

Since the Q terminal (enabling signal of the D-latch circuit 63) of the D flip flop circuit 611 on the final stage is connected with the reset terminal $\bar{R}$ of the R-S flip flop circuit 69 on the previous stage, the R-S flip flop circuit 69 on the previous stage is rendered reset when the data held in the D-latch circuit 62 on the previous stage is taken into the D-latch circuit 63 on the final stage. Therefore, the same operation is sequentially repeated at previous stages so that the data are shifted to subsequent stages since corresponding circuits on respective stages are identically formed.

However, one cycle and two cycles of an external clock CK are required to shift a data Y through one stage for writing and reading, respectively, in the aforementioned prior art FIFO memory device. Therefore, it is necessary to shift data through several stages until the data may be read after the commencement of the writing of the data if no data is stored so that a period of time, approximately one cycle of an external clock multiplied by the number of stages, is required. A period of time, approximate one cycle of an external clock CK multiplied by the number of stages and by two is required until a new data may be written after one data is read out if data are stored in all stages.

Therefore, the above prior art has a problem that a period of time until read-out becomes possible since writing and a period of time until a new data may be written again since reading out are extended with increase in the number of stages.

SUMMARY OF THE INVENTION

It is an object of the present invention to provide an FIFO memory device which is capable of shortening a period of time required for writing and reading.

It is another object of the present invention to provide an FIFO memory device in which a period of time of writing is shortened by memorizing the absence or presence of a data written in memory means in the FIFO memory device and by sequentially writing data responsive to a writing signal from memory means in a latter stage in which a data is not written.

It is a further object of the present invention to provide an FIFO memory device in which a period of time for reading is shortened by storing the absence or presence of a data written in memory means in the FIFO memory device and by simultaneously shifting data from one memory means to subsequent memory means at each clock in response to a read signal.

In a basic aspect of the present invention, there is provided an FIFO memory device comprising a plurality of memory means which are cascade-connected for serially storing input data, a plurality of selecting means for selecting an input data or a data stored in the memory means on a stage of interest to output it to the memory means on the subsequent stage, means for storing a state representative of whether or not a data has been written in said memory means, and means for controlling in write mode such that data are sequentially written into the memory means is order from the latter stage in which no data has been written/controlling in read mode such that data are shifted from each of the memory means to a respective subsequent memory means.

In accordance with the present invention, if no data has been written in memory means in a writing mode, reading is possible after one input data is written in memory means on the final stage by one clock. If data has been written in each of the memory means, each data is transferred every one clock in a reading mode, which results in that a period of time until a new data can be written from reading out would be one cycle of a clock multiplied by the number of stages.

BRIEF DESCRIPTION OF THE DRAWINGS

FIG. 3 is an explanatory table showing truth values of input and output signals in a combination circuit of FIG. 2;

FIGS. 6A through 6F are timing charts showing waveforms of signals in the first to third embodiment in writing and reading, modes, respectively;

DESCRIPTION OF THE PREFERRED EMBODIMENTS

Figure 1:
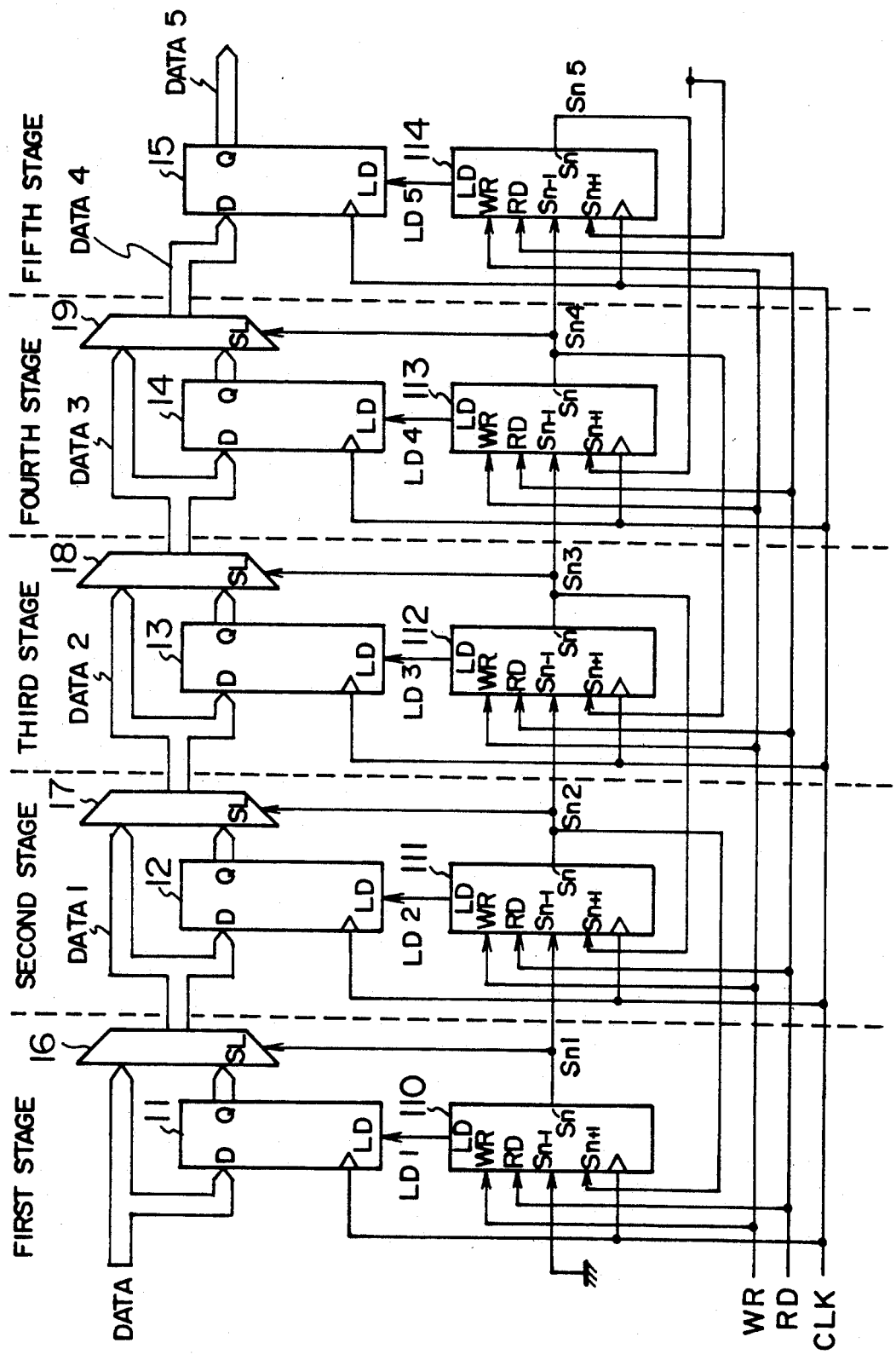
FIG. 1 is a block diagram showing an embodiment of an FIFO memory device in accordance with the present invention.
Figure 2:
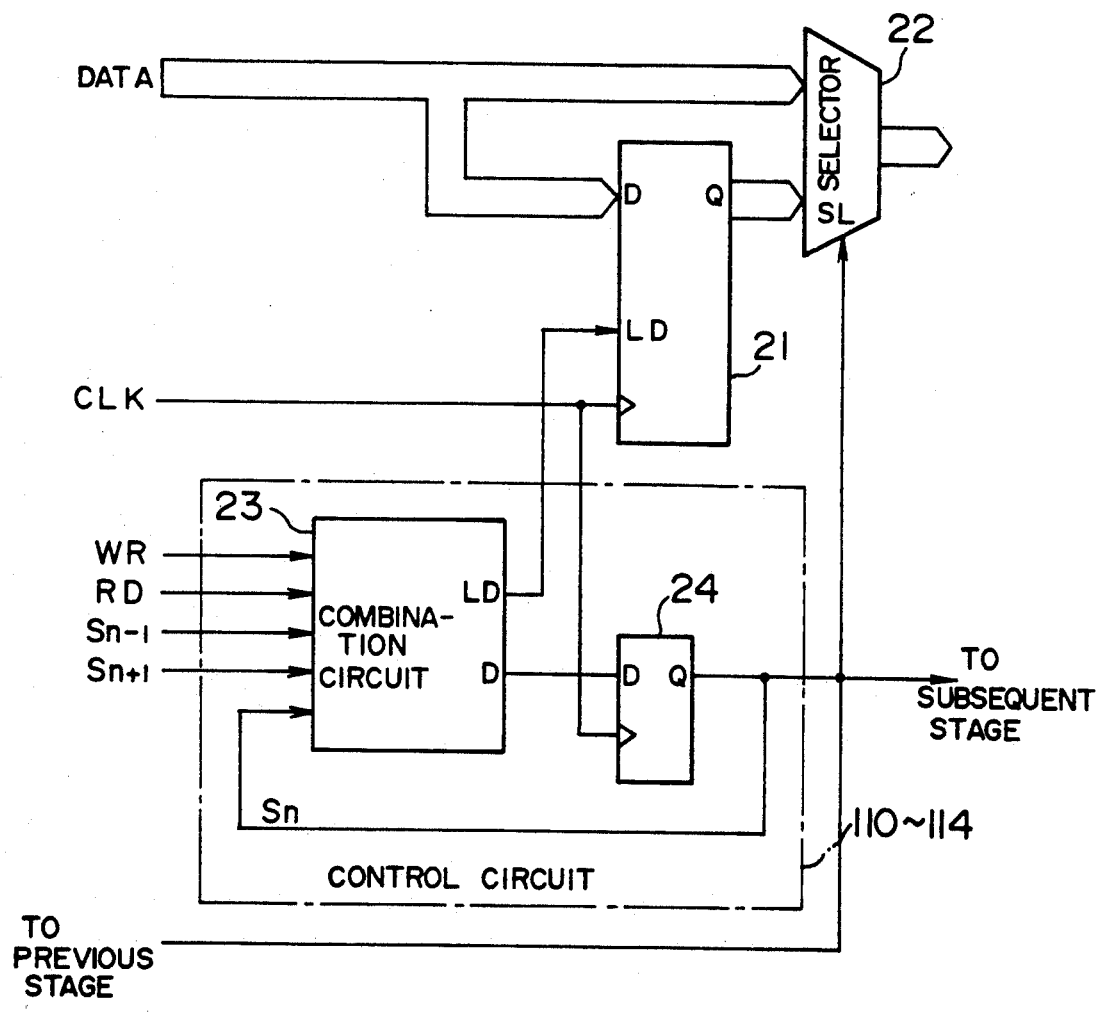
FIG. 2 is a block diagram showing the detailed structure of the circuits on one stage of the FIFO memory device shown in FIG. 1.

FIG. 1 is a block diagram showing an embodiment of an FIFO memory device in accordance with the present invention, FIG. 2 is a block diagram showing the detailed structure of the circuits on one stage in FIG. 1, FIG. 3 is an explanatory table showing truth values of input and output signals in the combination circuit of FIG. 2.

Referring now to FIG. 1, D-flip flop circuits 11 through 15 having load terminals LD which store an input data DATA including one bit or a plurality of bits are provided at respective stages (five stages in the present embodiment). Each of the D-flip flop circuits 11 through 15 is formed in such a manner that it receives an input data on a D terminal at the rise-up edge of a clock CLK when an input signal on the load terminal LD is on a high level.

Each of the D-flip flop circuits 11 through 14 except the D-flip flop circuit 15 on the final stage is connected with one of the input terminals of the selectors 16 through 19, respectively at a Q terminal thereof so that it outputs a signal to the input terminal of the selectors. Each of the selectors 16 through 19 selects an input data DATA, an output data from the selectors 16 through 18 on the previous stage or an output signal from the D-flip flop circuits 11 through 14, respectively and is adapted to output a signal to the terminal D of the D-flip flop circuits 12 through 15 and the selectors 17 through 19 on the subsequent stages, respectively. That is, no selector is used on the final stage.

Control circuits 110 through 114 each provided on respective stages are adapted to control writing and reading to and from the D-flip flop circuits 11 through 15. As shown in FIGS. 2 and 3, each of control circuits 110 through 114 comprises a combination circuit 23 for outputting a load signal LD to the D-flip flop circuit 21 responsive to a write signal WR, a read signal RD, an input signal Sn, an input signal Sn−1 from a previous stage and an input signal from a subsequent stage and a flip flop circuit 24 which delays an output signal D from the combination circuit 23 by a clock CK for feeding back the signal Sn as the input signal of the combination circuit 23 on the stage of interest and for outputting the output signal D as a select signal SL of the selector 22 on the stage of interest, an input signal Sn-1 to the combination circuit 23 on the next stage and an input signal Sn−1 to the combination circuit 23 on the previous stage.

The D-flip flop circuits 24 of the control circuits 110 through 114 are all in a reset state (the output signal Sn on the Q terminal is on a low level) when the input signal Sn-1 to the combination circuit 23 on the first stage is fixed on a low level, the input signal Sn+1 to the combination circuit 23 on the fifth stage is fixed on a high level and the FIFO memory is in an initial state, that is, no data is stored as shown in FIG. 1.

Accordingly, the select signals SL inputted to the selectors 16 through 19 are all low level and respective selectors 16 through 19 output the input data DATA and the output signals of the selectors 16 through 18 on the previous stage without converting the level.

Figure 6A:
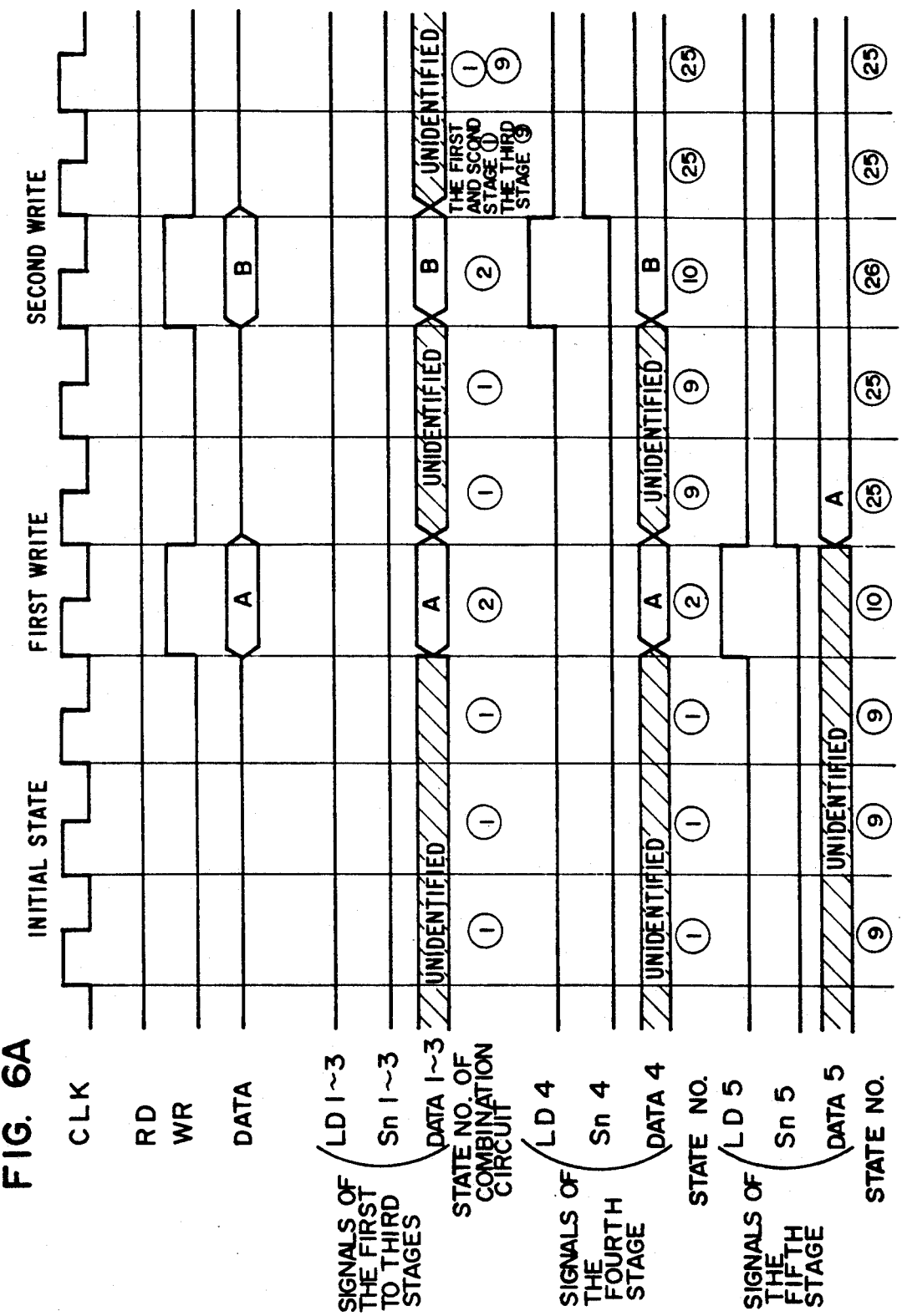

(1) Now write operation of the aforementioned embodiment will be described. FIG. 6A is a timing chart showing signal waveform at a write mode of the aforementioned embodiment.

In FIG. 1, it is assumed that all circuits are in an initial state, that is, no data is stored therein. In this state, input and output signals of the combination circuits 23 in the control circuits 110 through 113 on the first to fourth stages assume a state represented by ① in FIG. 3. Input and output signals of the combination circuit 23 in the control circuit 114 on the fifth stage assumes a state represented by ④ in FIG. 3.

When the write signal WR becomes a high level, the combination circuits 23 in the control circuits 110 through 113 on the first through fourth stages are brought into a state represented by ② and the fifth stage is brought into a stage ⑩, and the input data DATA is fed to the D-flip flop circuit 15 on the fifth stage via the selectors 16 through 19. At the rise-up edge of next clock CLK, the input data DATA is directly taken and stored in the D-flip flop circuit 15 (FIG. 6A).

Accordingly, one input data DATA may be stored in the D-flip flop circuit 15 on the final stage for one cycle of clock CLK so that the stored data DATA may be read out immediately.

Simultaneously with that the D-flip flop circuit 15 on the fifth stage directly takes in the input data DATA, the output signal Sn from the D-flip flop circuits 24 of the control circuit 114 on the fifth stage becomes a high level representing that a data is stored in the fifth stage. At this time, the state of the combination circuit 23 of the control circuit 114 on the fifth stage assumes a stage ㉕. Since the input signal Sn+1 of the combination circuit 23 of the control circuit 113 on the fourth stage is on a high level, the fourth state assumes a state ⑨. If no data is thereafter written, the write signal WR is returned to a low level before the rise-up edge of next clock CLK.

When the write signal WR becomes a high level again (second write), the load signal LD of the control circuit 113 on the fourth stage becomes a high level as represented by a state ⑩ in FIG. 3 and the D-flip flop circuit 14 on the fourth stage directly takes the input data DAT at the rise-up edge of the next clock.

Simultaneously with this, the output signal Sn 4 of the D-flip flop circuit 24 of the control circuit 113 on the fourth stage becomes a high level, representing that a data is stored in the fourth stage. The select signal SL of the control circuit 113 on the fourth stage becomes high level and the selector 19 on the fourth stage selects the output signal of the D-flip flop circuit 14 for outputting it to the D-flip flop circuit 15 on the subsequent stage.

Similarly, when the write signal WR becomes a high level again (third write), the combination circuit of the control circuit on the third stage is brought into a state ⑩ and the D-flip flop circuit 13 on the third stage takes an input data DATA and the selector 18 on the third stage selects an output signal from the D-flip flop circuit 13 for outputting it to the D-flip flop circuit 14 on the subsequent stage.

(2) Now, read operation in the above mentioned embodiment will be described. FIG. 6B is a timing chart showing waveforms on a read mode in the present embodiment. It is assumed that data is written in all the D-flip flops 11 through 15. In this case, the output signals Sn1 through Sn5 from the D-flip flop circuits 24 of the control circuits 110 through 114 are all on a high level. Accordingly, the select signals SL to the selector 16 through 19 are all on a high level so that the selectors 16 through 19 select output signals from the D-flip flop circuits 11 through 14, respectively. Accordingly, FIG. 6B shows that the selected output DATA 1 of the selector 16, DATA 2 of the selector 17, the outputs DATA 3 through DATA 5 of the selector 18, 19 and the flip flop 15 will be data A, B, C, D and E, respectively.

In FIG. 1, when a readout signal RD becomes a high level (first read), all the load signals LD of the combination circuit 23 of the control circuits 110 through 114 become a high level as shown by a state ㉛ in FIG. 3 and the D-flip flops 11 through 15 output respective data at the rise-up edge of the next clock so that a shift operation is performed. That is, the combination circuit on the second stage assures a state ㉕ and the combination circuits on the third through fifth stages assume a state ㉙. Accordingly, outputs DATA 2 through 4 from the selectors 17 through 19 become data A, B and C, respectively, and the output DATA 5 becomes data D. The data on respective stages before one reading are simultaneously shifted by one stage toward D-flip flops on the output side responsive to one read operation.

Simultaneously with this, the output signal Sn1 of the D-flip flop circuit 24 of the control circuit 110 on the first stage becomes a low level, representing that no data is stored in the D-flip flop circuit 11 on the first stage (a stage ⑨ of the combination circuit). If a data is not successively read, the read signal is returned to a low level prior to rise-up edge of the next clock.

When the read signal RD becomes high level again (second read), each of D-flip flops 12 through 15 outputs respective data at the rise-up edge of the next clock to perform a shift operation. The DATA 3, DATA 4 and DATA 5 become data A, B and C, respectively as the result that the respective data are concurrently shifted. The output signal Sn2 of the D-flip flop circuit 24 of the control circuit 111 on the second stage becomes low level, representing that no data is stored in the D-flip flop circuit 12 on the second stage.

Accordingly, (in the above mentioned embodiment, data in each of the D-flip flop circuits on the first to fifth stages may be shifted to the subsequent stage in one cycle of clock. All data may be read out by five clock pulses.

(3) Now, operation when the write signal WR and the read signal RD simultaneously become a high level will be described. It is assumed that data is stored in all the D-flip flops similarly to the case of the read operation (2).

When the write signal WR and the read signal RD simultaneously become a high level in FIG. 1, the load signals of all the control circuits 110 through 114 become a high level as represented by a state signal (28) of the first stage and a state signal (32) of the second to fifth stage shown in FIG. 3. Accordingly, the D-flip flops 11 through 15 output respective data at the rise-up edge of the next clock to perform the shift operation. In other words, a new input data is taken into the D-flip flop circuit 11 on the first stage and a data is read from the D-flip flop circuit 15 on the fifth stage.

Accordingly, in accordance with the present embodiment, the number of stages may be readily increased or decreased since the circuit structure of one stage is substantially identical with that of the other stage.

In the present embodiment, the D-flip flop circuits 24 of the control circuits 110 through 114 may be replaced with other flip flop circuits such as S-R flip flop.

Figure 4:
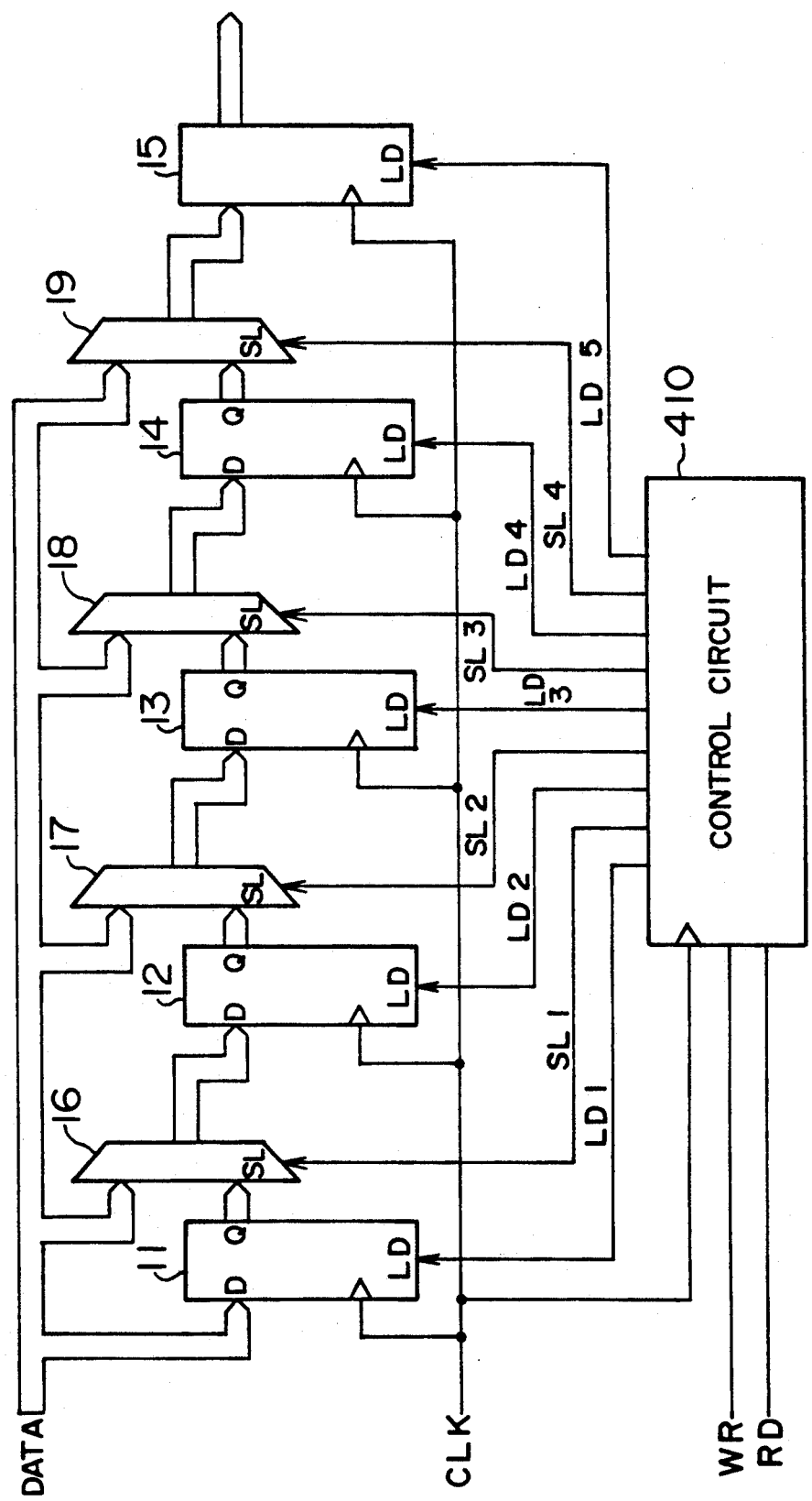
FIG. 4 is a block diagram showing a second embodiment of the FIFO memory device in accordance with the present invention.

FIG. 4 shows a second embodiment of the present invention in which component like to that in FIG. 1 is designated with like reference numeral.

Although the selectors 16 through 19 are connected in such a manner that they select input data DATA, output signals from the selectors 16 through 18 on the previous stage or output signals from the D-flip flop circuits 11 through 14 in the first embodiment, the selectors 16 through 19 are connected in such a manner that they select input data DATA, or output signals from the D-flip flop circuits 11 through 14 in the present embodiment. The present embodiment is formed so that one control circuit 410 centrally controls the D-flip flop circuits 11 through 15 and the selectors 16 through 19.

Accordingly, the present embodiment has advantages that delay time is shorter than that of the first embodiment and the number of stages will not give any influence to write speed since an input data DATA passes through only the selector 19 if the input data DATA is written into the D-flip flop circuit 15 on the final stage in an initial stage, that is in a state in which no data is stored.

Although the present embodiment also has an advantage that the circuits are simple in structure since one control circuit 410 centrally controls the memory device, the central control circuit may be formed of discrete circuits provided for each stage similarly to the first embodiment.

Figure 6C:
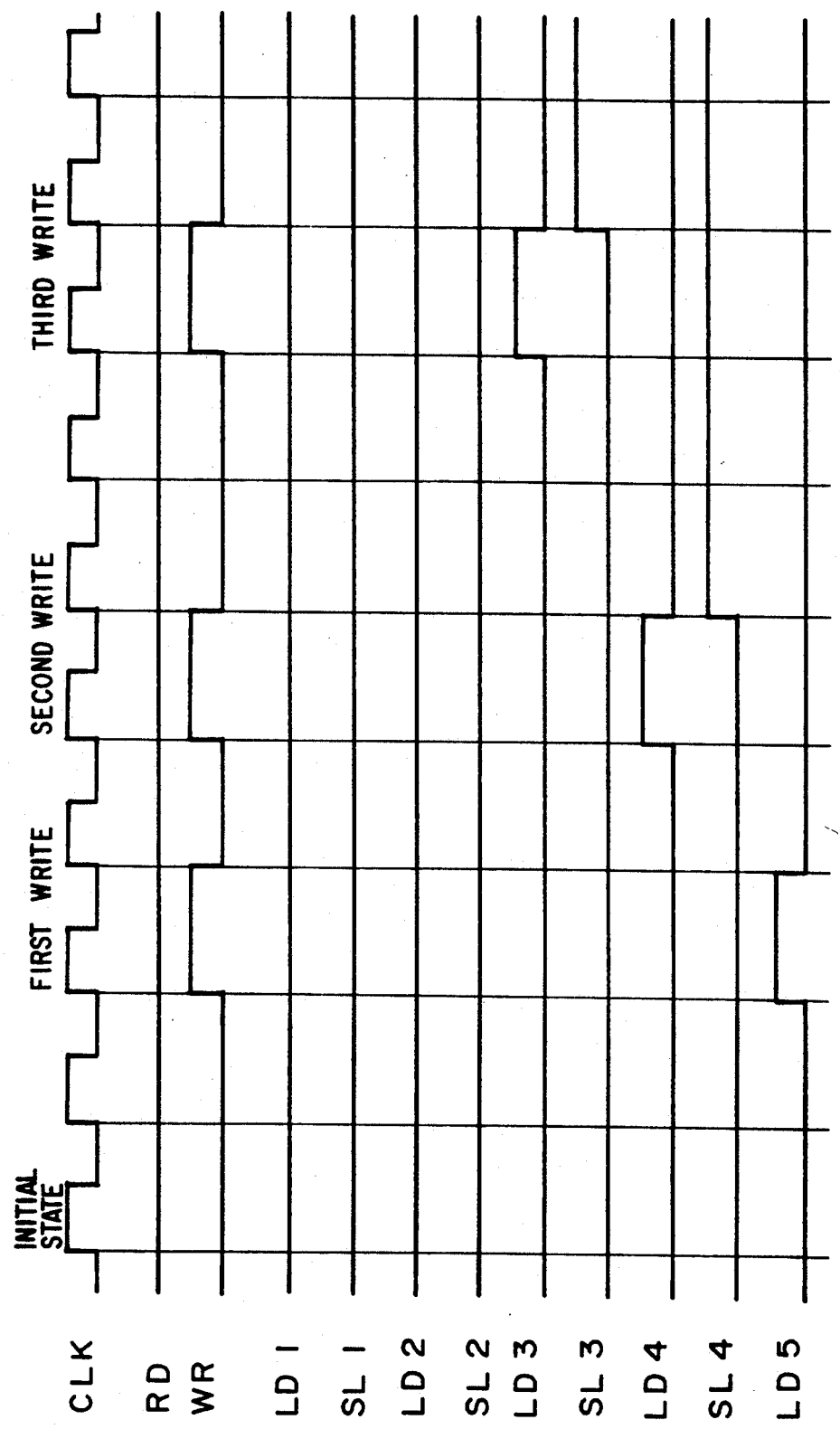
Figure 6D:
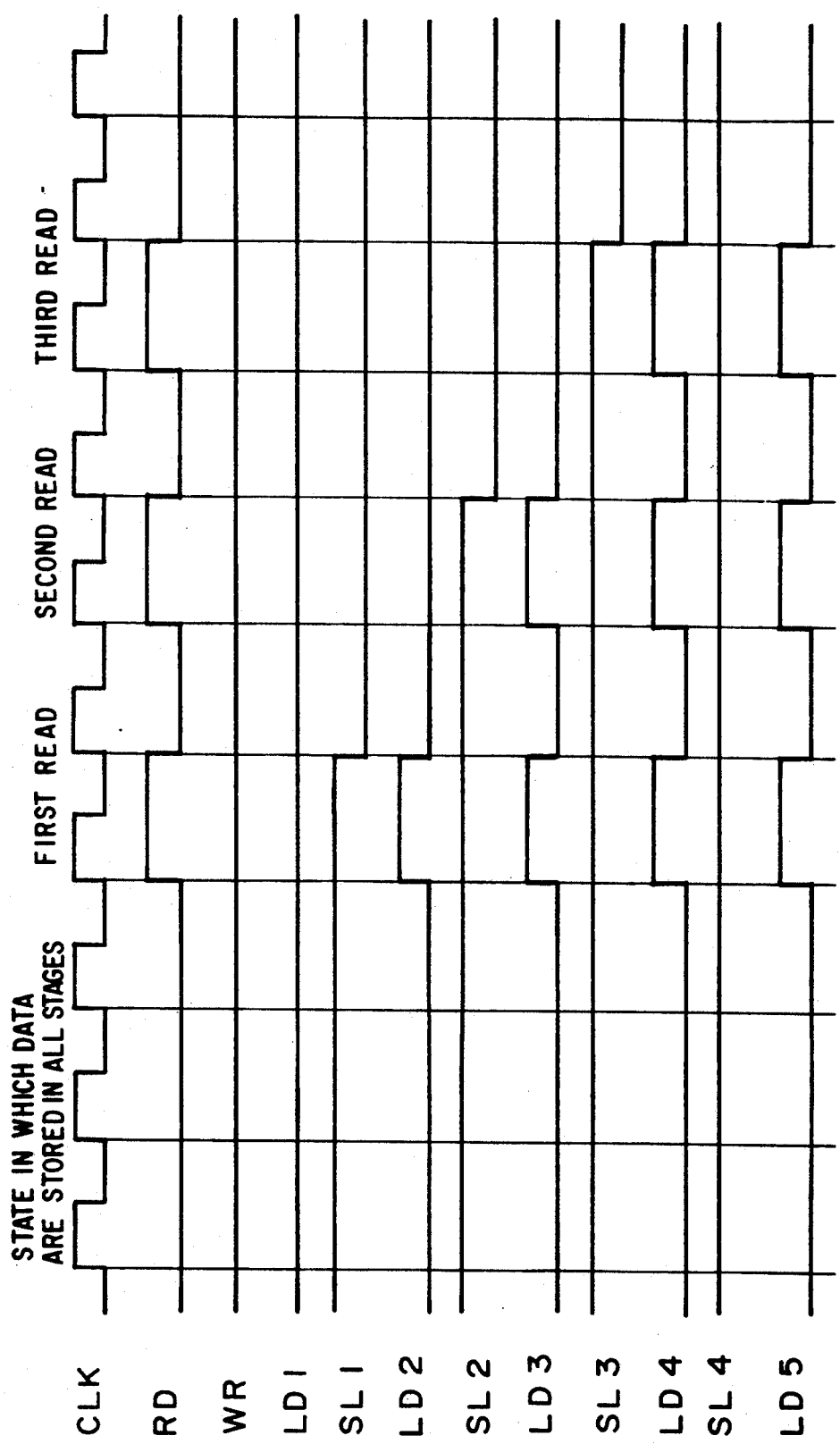

FIG. 6C is a timing chart of signal waveform in a write mode in the second embodiment, showing a write operation similar to that of FIG. 6A. FIG. 6D is a timing chart showing signal waveform in a read mode.

Figure 5:
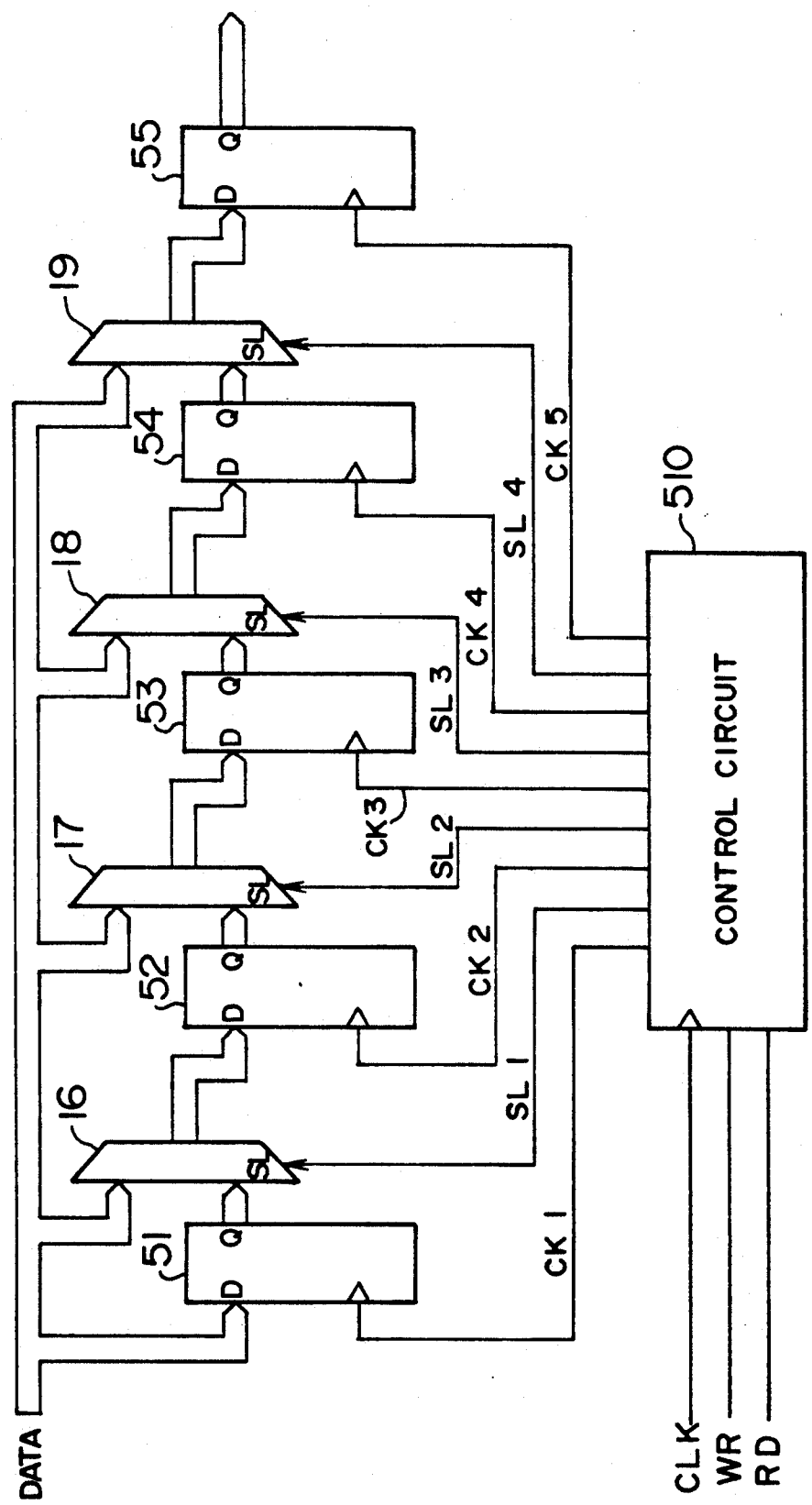
FIG. 5 is a block diagram showing a third embodiment of the FIFO memory device in accordance with the present invention.

FIG. 5 shows a third embodiment of the present invention in which the selectors 16 through 19 are connected in such a manner that they select input data DATA, or output signals from the D-flip flop circuits 11 through 14.

In the third embodiment, usual D-flip flop circuits 51 through 55 are used in lieu of the flip flop circuits 11 through 15 each having a load terminal. One control circuit 510 controls clock dignals to the D-flip flop circuits 51 through 55 for performing write and read control.

Accordingly, in accordance with the present embodiment the memory device may be manufactured at a low cost since usual D-flip flop circuits 51 through 55 are used circuit structure of the memory device is simple since the memory device is controlled by one control circuit 510.

Figure 6E:
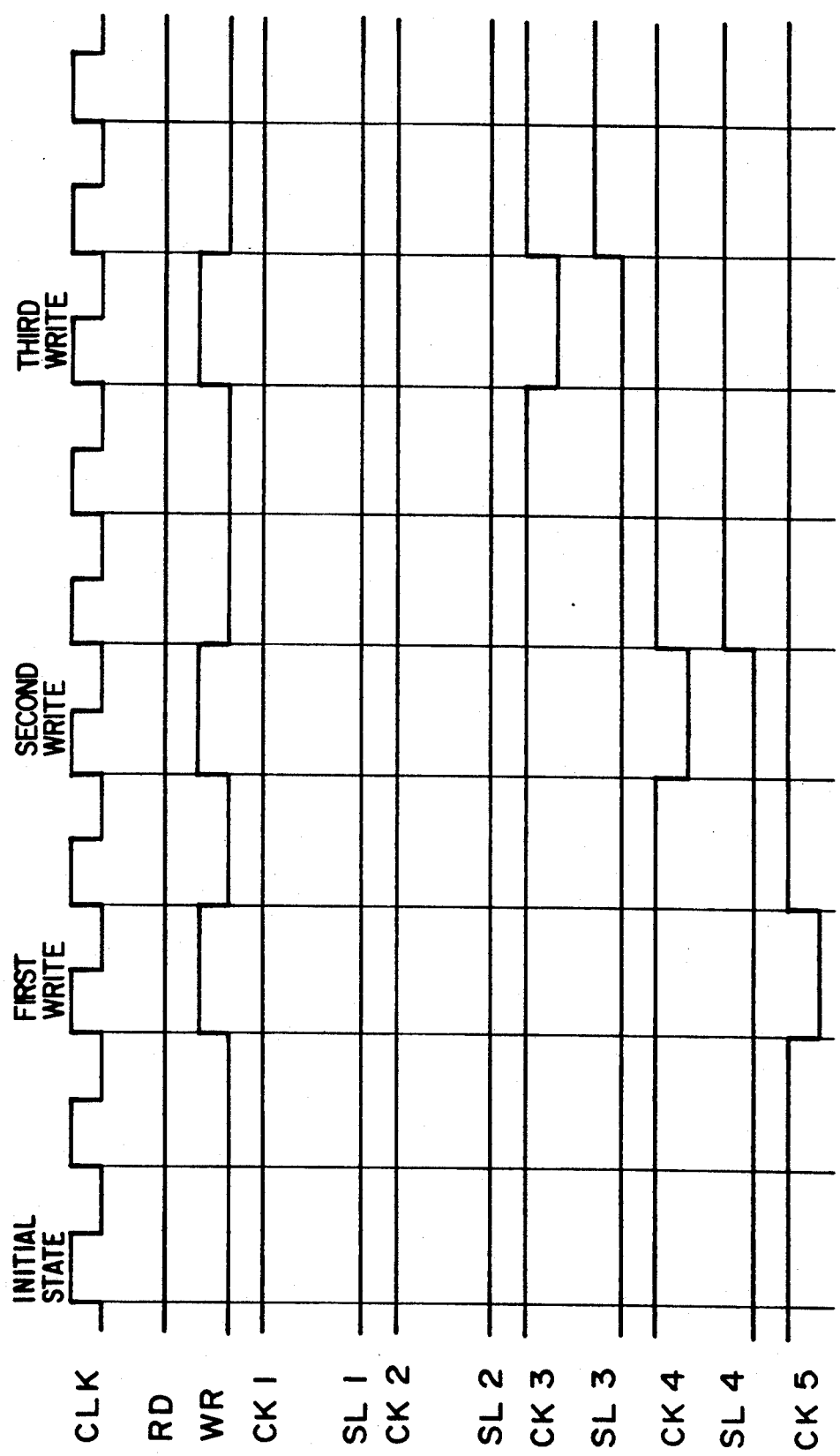
Figure 6F:
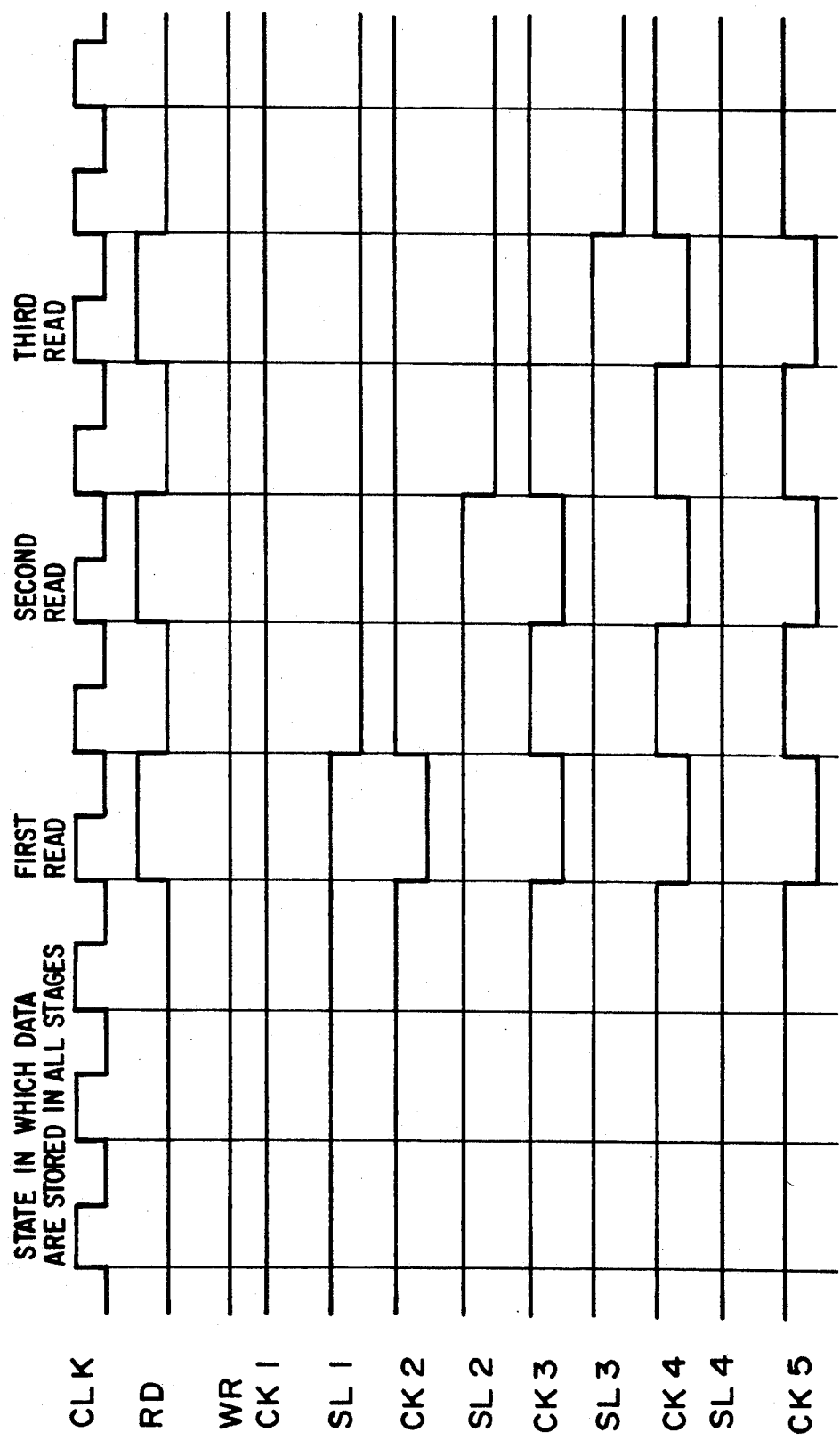
Figure 7:
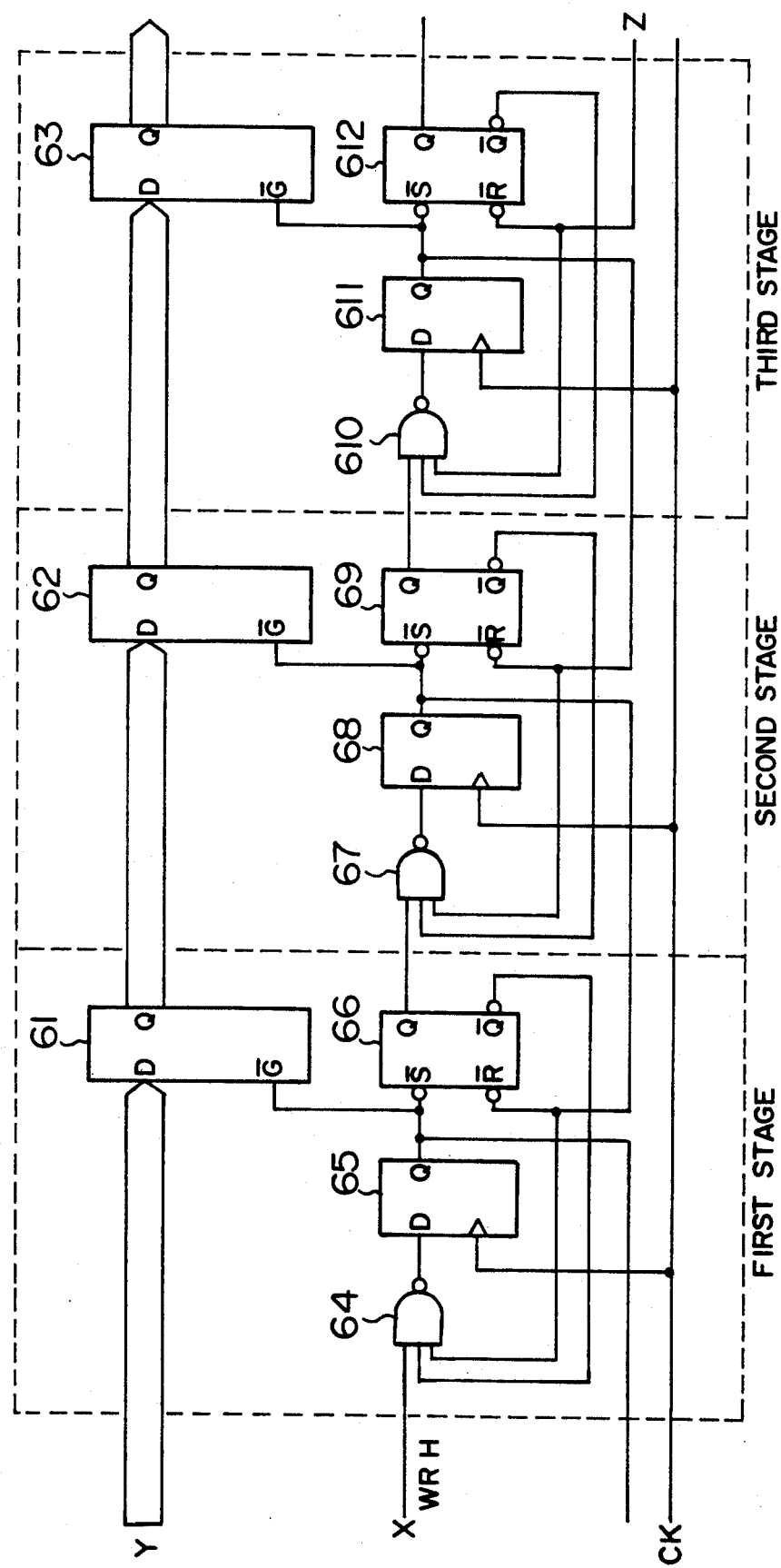
FIG. 7 is a block diagram showing a prior art FIFO memory device.

FIG. 6E is a timing chart showing a signal waveform in a write mode of the third embodiment. FIG. 6F is a timing chart showing a signal form in a read mode of the third embodiment.

The control circuit 510 may be formed of discrete circuits provided for each stage similarly to the first embodiment. The write signal WR and the clock CLK may be a same input signal. The read signal RD and the clock CLK may be a same one input signal. The clock CLK may be omitted.

It is possible to achieve operations of the control circuits used in the first to third embodiments by program-controlled CPUs or by IC logical circuits composed according to thruth tables as shown in FIG. 3. Those skilled in the art would make various modifications or developments of the foregoing embodiments without departing from the spirit of the appended claims.

What is claimed is:
1. A FIFO memory device, comprising:
a series of stages comprising a series of memory means cascade-connected for sequentially storing a plurality of data items input one-by-one, a plurality of selection means each connected between adjacent ones of said memory means, each of said selection means and an immediately preceding one of said memory means constituting one of said stages, each of said selection means (a) selecting one of said plurality of data items which is either (i) stored in said immediately preceding one of said memory means or (ii) an output of one of said selection means which is in an immediately preceding one of said series of stages and (b) supplying the selected one of said data items to an immediately subsequent stage of said series of stages;
means for storing information indicating which one or ones of said memory means have one of said data items written therein to indicate which of said stages are vacant stages; and
control means for controlling writing of a new data item of said plurality of data items input into the series of stages by writing said new data item into one of said memory means which is associated with a last stage among said vacant stages and for controlling reading of one of said data items by outputting a data item from a last stage of said series of stages and shifting data items which are stored in all others of said memory means sequentially to subsequent ones of said stages.

2. A FIFO memory device, comprising:
(a) a series of stages comprising a series of memory means cascade-connected for sequentially storing a plurality of data items input one-by-one, a plurality of selection means each connected between adjacent ones of said memory means, each of said selection means and an immediately preceding one of said memory means constituting one of said stages, each of said selection means (a) selecting one of said plurality of data items which is either (i) stored in said immediately preceding one of said memory means or (ii) an output of one of said selection means which is in an immediately preceding one of said series of stages and (b) supplying the selected one of said data items to an immediately subsequent stage of said series of stages;

means for storing information indicating which one or ones of said memory means have one of said data items written therein to indicate which of said stages are vacant stages; and control means for controlling writing of a new data item of said plurality of data items input into the series of stages by writing said new data item into one of said memory means which is associated with a first stage among said plurality of stages and sequentially transferring said new data item stage-by-stage to a last stage among said vacant stages and for controlling reading of one of said data items by outputting a data item from a last stage of said series of stages and simultaneously transferring data items which are stored in all others of said memory means to subsequent ones of said stages.

3. A FIFO memory device, comprising:

(a) a series of stages comprising a series of memory means cascade-connected for sequentially storing a plurality of data items input one-by-one, a plurality of selection means each connected between adjacent ones of said memory means, each of said selection means and an immediately preceding one of said memory means constituting one of said stages, each of said selection means (a) selecting one of said plurality of data items which is either (i) stored in said immediately preceding one of said memory means or (ii) an output of one of said selection means which is in an immediately preceding one of said series of stages and (b) supplying the selected one of said data items to an immediately subsequent stage of said series of stages;

means for storing information indicating which one or ones of said memory means have one of said data items written therein to indicate which of said stages are vacant stages; and control means for controlling writing of a new data item of said plurality of data items input into the series of stages by writing said new data item into one of said memory means which is associated with a last stage among said vacant stages and for controlling reading of one of said data items by simultaneously outputting a data item from a last stage of said series of stages and transferring data items which are stored in all others of said memory means to subsequent ones of said stages.

4. A FIFO memory device according to claim 1, wherein each of said selecting means is supplied with an input data which is applied to an immediately preceding one of said memory means of a corresponding one of said stages and is supplied with one of said data items stored in said immediately preceding one of said memory means of the corresponding one of said stages.

5. A FIFO memory device according to claim 1, further comprising clock means for supplying said control means and each of said stages with a clock signal, said control means controlling writing/reading of said data item in synchronism with the clock signal.

6. A FIFO memory device according to claim 2, wherein each of said selecting means is supplied with an input data which is applied to an immediately preceding one of said memory means of a corresponding one of said stages and is supplied with one of said data items stored in said immediately preceding one of said memory means of the corresponding one of said stages.

7. A FIFO memory device according to claim 3, wherein each of said selecting means is supplied with an input data which is applied to an immediately preceding one of said memory means of a corresponding one of said stages and is supplied with one of said data items stored in said immediately preceding one of said memory means of the corresponding one of said stages.

8. An FIFO memory device as defined in claim 1, in which control of said selecting means and memory means is centrally performed by a single control circuit.

9. An FIFO memory device as defined in claim 1, in which each of said memory means comprises a D-flip flop circuit having a load terminal.

10. An FIFO memory device as defined in claim 1, in which each of said memory means comprises a D-flip flop circuit.

11. An FIFO memory device as defined in claim 1, in which each of said memory means comprises flip flop circuit.

* * * * *